Feb. 9, 1954 E. W. D'ARCY 2,668,879

MAGNETIC SOUND PICKUP RECORDER HEAD AND SUPPORT THEREFOR

Filed July 1, 1952

INVENTOR:
Ellis Wellington D'Arcy
BY Clarence E. Threedy
HIS ATTORNEY

Patented Feb. 9, 1954 2,668,879

UNITED STATES PATENT OFFICE 2,668,879

MAGNETIC SOUND PICKUP RECORDER HEAD AND SUPPORT THEREFOR

Ellis Wellington D'Arcy, Chicago, Ill., assignor to De Vry Corporation, Chicago, Ill., a corporation of Illinois Application July 1, 1952, Serial No. 296,658

8 Claims. (Cl. 179—100.2)

This invention relates to a magnetic sound pick-up recorder head and support therefor and has for its principal object the provision of an improved construction of this character which will be highly efficient in use and economical in manufacture.

In order to accomplish the best results in the sound pick-up recording where there is employed a track of paramagnetic material or surface coating, the magnetic head must present itself to such a track with the proper contact and in proper parallel relation and alignment with respect to the track. If these conditions do not prevail, faulty operation and performance will result. It is therefore a principal object of this invention to provide a magnetic head capable of universal adjustment relative to the paramagnetic track or surface.

To accomplish this, it is my intention to provide a support or mounting for the magnetic head, which is capable of adjustment in various directions with respect to the track so that the operator may upon making such adjustments, present the head in proper relation and position with respect to such track.

Yet another and equally important object of the invention is the provision of such an arrangement which is relatively simple in construction and easy of installation, with the result that the same may be manufactured and sold at an economical cost.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3, 4, 5, 6, 7, 8:
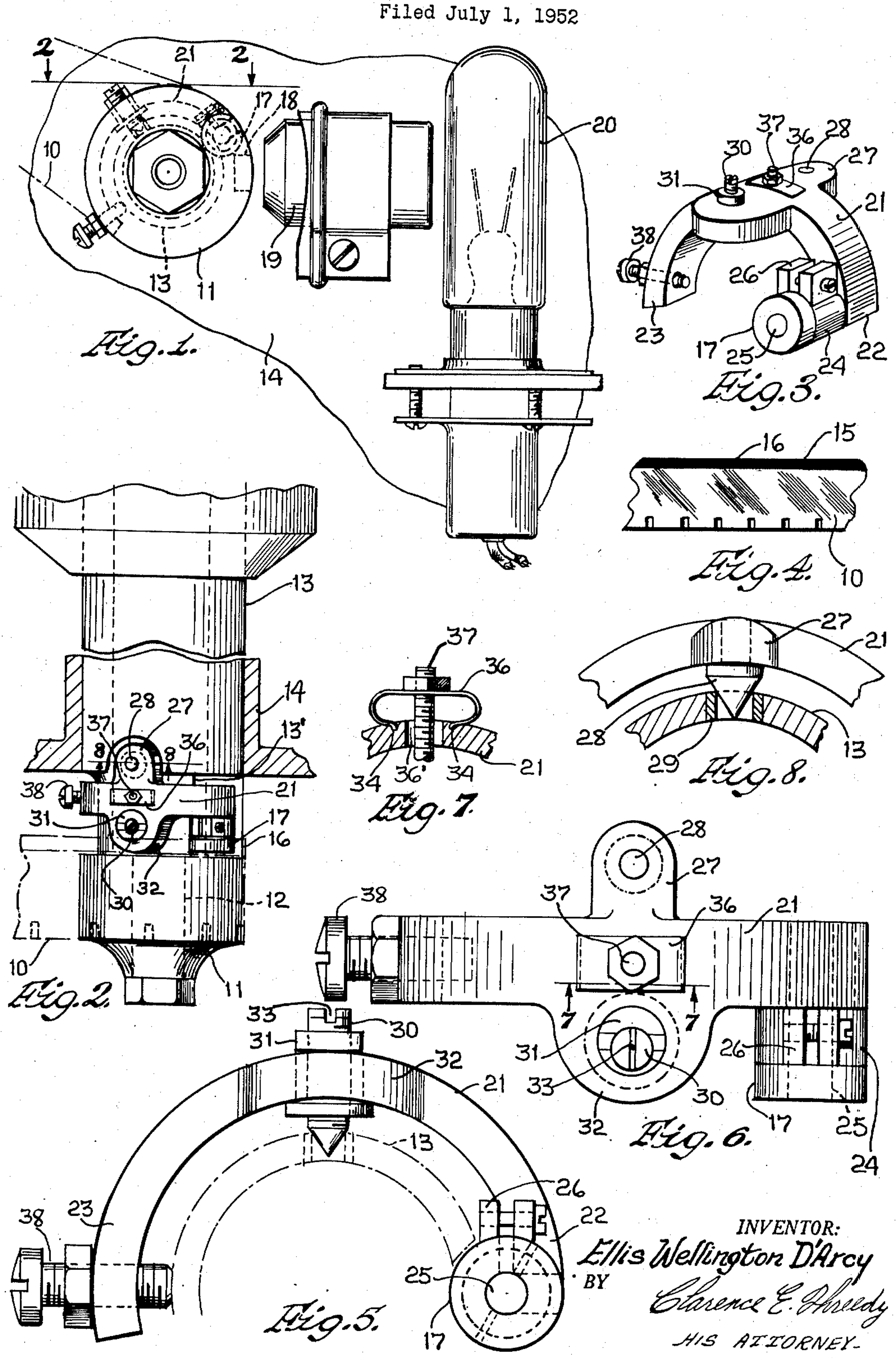
Fig. 1 is a fragmentary enlarged elevational view showing the invention in association with a sound drum of a sound pick-up recorder.
Fig. 2 is a fragmentary plan view taken substantially on line 2—2 of Fig. 1.
Fig. 3 is a perspective view of the mounting yoke.
Fig. 4 is a fragmentary view of a film, showing one edge thereof coated with a paramagnetic material.
Fig. 5 is a side view of the yoke shown in Fig. 3.
Fig. 6 is a plan view of the same.
Fig. 7 is a fragmentary sectional detail view taken substantially on line 7—7 of Fig. 6.
Fig. 8 is a fragmentary sectional detail view taken substantially on line 8—8 of Fig. 2.

The several objects of my invention are preferably accomplished by the form of construction shown in the accompanying drawings, in which drawings the figures are enlarged views of the invention.

Fig. 4 of such drawings illustrates a conventional film 10 which is adapted to pass over a sound drum 11 mounted on a shaft 12 journalled in a suitable bearing 13 carried by the frame of the apparatus 14. The film 10 along one longitudinal edge 15 has a track 16 which is formed of paramagnetic material, the width of the film 10 with respect to that of the sound drum 11 being such that the track 16 will extend beyond the adjacent periphery of the drum 11 as shown in Fig. 2, where it will be exposed to a magnetic head 17. A light shaft 18 is arranged in the bearing 13 and exposed at one end to a lens assembly 19 which directs a light beam from an exciter lamp 20 for transmission through the light shaft 18 to a photoelectric cell (not shown). This arrangement is substantially similar to that shown in pending application, Serial No. 183,984 filed September 9, 1950, by John S. Powers et al.

My invention, as hereinbefore indicated, is concerned principally with the mounting of the magnetic head 17 so that this head may be adjusted to a proper position with respect to the film track 16 to assure proper performance. This mounting includes a yoke 21 formed to provide oppositely disposed arms 22 and 23. The arm 22 has a bearing 24 into which is mounted the shaft 25 carrying the magnetic head 17. The shaft 25 after adjustment is clamped in the bearing 24 by a clamping structure 26. By this arrangement the shaft 25 may be rotated within the bearing 24 to adjust the magnetic head 17 relative to the track 16.

Extending inwardly and laterally from the top of the yoke 21 is an arm 27. This arm 27 has fixedly secured therein a pivot pin 28. This pivot pin 28, as shown in Fig. 8, projects into an insert 29 of hardened material, the insert 29 being mounted in the bearing 13.

This pivot pin 28 permits oscillatory, as well as vertical adjustment, of the yoke 21 relative to the drum 11 to vary the position of the magnetic head relative to the track 16. The vertical adjustment of the yoke is accomplished by an adjustable screw 30 threaded eccentrically through a disc 31 mounted in a forward extending arm 32 of the yoke 21. The point of the screw 30 projects into a hardened insert, similar to the insert 29, imbedded in the bearing 13.

This screw 30 (which has a screwdriver slot 33 formed therein to permit adjustment by a screwdriver) when adjusted moves the yoke approximately vertically about the contact point between the pivot pin 28 and its insert 29. This adjustment brings the magnetic head 17 into closer position with respect to the adjacent surface of the track 16.

By adjusting the eccentric disc 31, the yoke 21 may be bodily adjusted horizontally about the point of contact between the pin 28 and its insert 29, to position the magnetic head in a more exact parallel relation with respect to the track 16.

This vertical adjustment of the yoke 21 with respect to the point of contact of the pivot pin 28 and its point of contact with the insert 29 is against the action of a flat spring 36 having curved ends which engage in parallel notches 34 formed in the yoke 21. A screw 37 projects through the spring 36 and through an enlarged opening 36′ in the yoke 21 and is threaded in the bearing 13, the enlarged opening 36′ permitting the several adjustments of such yoke 21.

The arm 23 carries an adjustment screw 38, the inner end of which bears against the bearing 13. By adjusting this screw 38, the yoke 21 will be moved radially about the bearing 13 to move the magnetic head from and toward the track 16.

The screw functions also to retain the yoke 21 upon the bearing 13, portions 13′ of which bearing are cut or milled away to make room for the yoke 21.

A mounting constructed in accordance with the foregoing description permits universal adjustment of the magnetic head, which adjustment is a necessity for proper positioning of the magnetic head with respect to the track 16, to assure proper performance thereof.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, a magnetic head carried by one of said arms with one surface thereof in confronting relation with respect to the track, means for connecting the yoke to the bearing, and means for universally adjusting the yoke relative to said point of connection with said bearing.

2. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, a clamping bearing provided by one of said arms, a magnetic head having a shaft inserted in said bearing and having one surface thereof in confronting relation with respect to the track, means for connecting said yoke to the bearing, and means for universally adjusting the yoke relative to said point of connection with said bearing.

3. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, a magnetic head, means for adjustably connecting said magnetic head to one of said arms, said head having one surface thereof in confronting relation with respect to the track, means for connecting the yoke to the bearing, and means for universally adjusting the yoke relative to said point of connection with said bearing.

4. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, a magnetic head carried by one of said arms with one surface thereof in confronting relation with respect to the track, yieldable means for connecting the yoke to the bearing, and means for universally adjusting the yoke relative to said point of connection with said bearing.

5. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, a clamping bearing provided by one of said arms, a magnetic head having a shaft inserted in said bearing and having one surface thereof in confronting relation with respect to the track, yieldable means for connecting said yoke to the bearing, and means for universally adjusting the yoke relative to said point of connection with said bearing.

6. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, said yoke having opposite laterally extending arms at a point midway between the ends of said oppositely disposed arms, a pivot pin carried by one of said laterally extending arms and insertable in a seat provided by said bearing, a rotatable disc carried by the other of said laterally extending arms, an adjustable screw eccentrically carried by said disc and bearing upon a seat provided by said bearing, a magnetic head carried by one of said oppositely disposed arms with one surface thereof in confronting relation with respect to said track, and an adjustable screw carried by the other of said oppositely disposed arms and bearing against said bearing for varying the position of said head with respect to said track.

7. The combination with a sound drum, a shaft therefor, a bearing for the shaft, and a film passing over said sound drum and having on one longitudinal edge a track of paramagnetic material, of a yoke having oppositely disposed arms positioned on opposite corresponding sides of said bearing adjacent said drum, said yoke having opposite laterally extending arms at a point midway between the ends of said oppositely disposed arms, a pivot pin carried by one of said laterally extending arms and insertable in a seat provided by said bearing, a rotatable disc carried by the other of said laterally extending arms, an adjustable screw eccentrically carried by said disc and bearing upon a seat provided by said bearing, a magnetic head carried by one of said oppositely disposed arms with one surface thereof in confronting relation with respect to said track, an adjustable screw carried by the other of said oppositely disposed arms and bearing against said bearing for varying the position of said head with respect to said track, and means for clampingly securing said head to said one of said oppositely disposed arms in a predetermined position.

8. The combination with a sound drum, a shaft therefor, a bearing for a shaft, and a film passing over said sound drum and having on one longitudinal edge a track of paramagnetic material, of a yoke having oppositely disposed arms positioned on opposite corresponding sides of said bearing adjacent said drum, one of said oppositely disposed arms having a clamping bearing, said yoke having opposite laterally extending arms at a point midway between the ends of said oppositely disposed arms, a pivot pin carried by one of said laterally extending arms and insertable in a seat provided by said bearing, a rotatable disc carried by the other of said laterally extending arms, an adjustable screw eccentrically carried by said disc and bearing upon a seat provided by said bearing, a magnetic head, a shaft on said head and projected into said clamping bearing, said head having one surface thereof in confronting relation with respect to said track, an adjustable screw carried by the other of said oppositely disposed arms and bearing against said bearing for varying the position of said head with respect to said track, and means for clampingly securing said head to said one of said oppositely disposed arms in a predetermined posititon.

ELLIS WELLINGTON D'ARCY.

References Cited in the file of this patent

UNITED STATES PATENTS

| Number | Name | Date |
|---|---|---|
| 2,605,365 | Masterson | July 29, 1952 |